Figure 1:
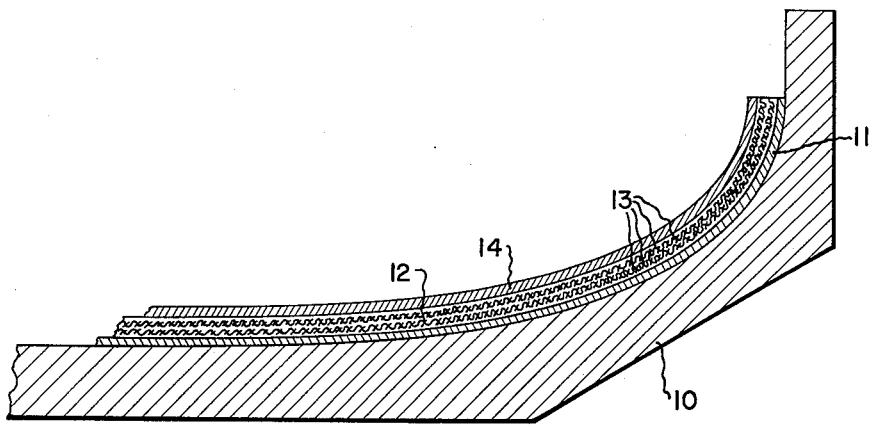

Oct. 30, 1962  F. G. SINGLETON ET AL  3,061,492
FLAME RETARDANT POLYESTER LAMINATES
Filed Sept. 22, 1960

INVENTORS
FRED G. SINGLETON
PATRICK J. KEENAN
BY
Harry B. Keck
ATTORNEY

United States Patent Office 3,061,492
Patented Oct. 30, 1962

3,061,492
FLAME RETARDANT POLYESTER LAMINATES
Fred G. Singleton and Patrick J. Keenan, Pittsburgh, Pa., assignors to H. H. Robertson Company, Pittsburgh, Pa., a corporation of Pennsylvania
Filed Sept. 22, 1960, Ser. No. 57,687
2 Claims. (Cl. 154—43)

The present invention relates to polyester laminates which are flame retardant.

Unsaturated polyester resin compositions are widely employed in industry for fabricating various molded parts and structures. Usually molded polyester resin compositions are employed in combination with glass fibers or glass fabrics which provided added structural strength to the molded product. Such resin compositions, for example, are widely used in the fabrication of boat hulls.

Unsaturated polyesters are prepared by reaction of dihydric alcohol with a dicarboxylic acid or anhydride. At least a portion of the dicarboxylic acid or anhydride contains alpha-beta unsaturation which gives rise to the term "unsaturated polyesters." The unsaturated polyesters are blended with a solution of reactive monomers containing terminal ethylenic unsaturation such as styrene, vinyl toluene and the like. See U.S. Patent 2,255,313. Various inhibitors such as hydroquinone and tert-butyl catechol are added to the compositions to prevent premature gelation and polymerization. Various peroxy polymerization initiators are added to the compositions at the time of use to cause gelation and curing of the compositions.

In order to fabricate structures from unsaturated polyester resin compositions, there are sometimes two, but usually three separate coatings of the material which are applied in sequence to form a laminated structure. Initially a gel coat is applied to the exposed surfaces of the mold to assure a smooth molded surface and to facilitate removal of the molded product from the mold. The gel coat usually is a hardenable unsaturated polyester composition alone, i.e., no fibrous fillers are employed although some additives may be included to increase the thixotropic properties of the resin composition, for example, silica aerogel, dehydrated silica hydrogel, cellulose and the like.

After the application of the gel coat, a fibrous laminate core is applied in the form of one or more layers of glass fabric or glass fibers which are thoroughly wetted with hardenable unsaturated polyester resin composition so that the interstices are filled with the composition. The gel coat and the fibrous laminate core are universally provided in the fabrication of molded structures. In addition, there is usually a final application of a glaze coat over the fibrous laminate core to provide a smooth, attractive exposed surface. The glaze coat, like the gel coat, is a hardenable unsaturated polyester resin composition, usually free of fibrous fillers, although various other additive materials may be employed as fillers, such as substances which increase the thixotropic properties of the resin composition and substances which introduce opaque properties into the coat, such as calcium carbonate, titanium dioxide, pigments and the like.

One difficulty encountered in the utilization of unsaturated polyester laminate structures is the inherent flammability of the materials. Being substantially entirely organic in composition, apart from the fibrous fillers, the products are flammable. In order to provide flame retardant properties, highly halogenated dicarboxylic acids have been utilized heretofore in the preparation of the unsaturated polyester component. Instead of using phthalic acid, for example, some flame retardant polyesters are formulated from tetrachlorophthalic acid, tetrabromophthalic acid, "HET" acids and the like. Antimony oxide likewise has been incorporated into the compositions as a flame retardant filler. Where flame retardancy has been desired, the flame retardant unsaturated polyester resin compositions have been selected for use in the entire laminate.

According to the present invention, flame retardancy can be achieved in polyester laminates without resort to these relatively expensive expedients. Specifically we have found that flame retardancy can be achieved by utilizing flame retardant polyester compositions in the gel coat and in the glaze coat without the need for the relatively expensive flame retardant compositions in the fibrous laminate core.

As a specific feature of this invention, the desired flame retardancy is achieved by incorporating an effective quantity of pulverulent ammonium chloride or ammonium bromide into the unsaturated polyester resin composition which comprises the gel coat and the glaze coat. The flame retardancy achieved by the incorporation of these ammonium halides in unsaturated polyester resin compositions is described in co-pending application S.N. 57,621, filed on even date herewith by Patrick J. Keenan and assigned to the assignee of the present invention. While the use of ammonium halides achieves the desired flame retardancy, its incorporation results in a reduction in the flexural strength of the resulting polymerized products. That defect can be offset by utilizing conventional unsaturated polyester resins in the fibrous laminate core and providing the flame retardant unsaturated polyester resin compositions in the gel coat and in the glaze coat. Thus molded products can be obtained which possess the requisite structural strength resulting from the unchanged fibrous laminate core composition and which also possess flame retardant properties resulting from the flame retardant gel coat and flame retardant glaze coat.

The principal object of the present invention is to provide molded laminate structures from unsaturated polyester resin compositions which molded structures possess flame retardant properties.

A further object of this invention is to provide relatively inexpensive flame retardant molded laminate structures from unsaturated polyester resins which employ ammonium halides to achieve flame retardancy without loss of structural strength in the product.

These and other objects and advantages of the present invention will be set forth in the following detailed description by reference to the accompanying drawings:

FIGURE 1 is a fragmentary cross-section illustration of a mold for the fabrication of polyester laminates according to the present invention.

Referring to FIGURE 1, a fragmentary portion of a mold 10 is illustrated in cross-section. In the fabrication of polyester molded structures, there is a first gel coat 11 applied to the exposed surface of the mold 10. Thereafter a fibrous laminate core 12 is applied over the gel coat including glass fabric 13 or glass fiber mat having its interstices filled with an unsaturated polyester resin composition which also provides the adhesion necessary to bond the fibrous laminate core to the gel coat 11. Two independent layers of glass fabric 13 are illustrated in FIGURE 1. After application of the fibrous laminate core 12, a final glaze coat 14 is applied over the exposed fibrous laminate core 12. When the molded laminate structure is removed from the mold, the three layers or coats form an integral unit, substantially free of discontinuities.

According to current practice, where flame retardant properties are desired, the entire structure is fabricated from flame retardant polyester compositions, that is, the gel coat, the fibrous laminate core and the glaze coat.

According to the present invention, only the gel coat and the glaze coat are fabricated from flame retardant polyester resin compositions. Quite unexpectedly the over-all resulting structure acquires flame retardant properties.

In the preferred embodiment of the invention, the flame retardant polyester compositions are filled with pulverulent ammonium chloride or ammonium bromide. From about 5 to 50 parts by weight of ammonium halide per 100 parts by weight of the unsaturated polyester resin composition will achieve flame retardancy. Preferably about 15 to 40 parts by weight of the pulverulent ammonium halide are provided for each 100 parts by weight of the polyester resin composition in order to achieve so-called "self-extinguishing" properties as set forth in ASTM Test D635–56T. The pulverulent ammonium halide provides opacity in the outer coatings. The cured, hardened products of the polyester resin compositions containing ammonium halides are resistant to water immersion of the laminated structure.

EXAMPLES

*Example I.*—An unsaturated polyester was prepared by esterification of the following ingredients:

|  | Mols |
| --- | --- |
| Diethylene glycol | 1.0 |
| Propylene glycol | 3.5 |
| Phthalic anhydride | 2.5 |
| Maleic anhydride | 2.0 |

The resulting unsaturated polyester was dissolved in styrene to achieve a solution of 40 parts of styrene and 60 parts of unsaturated polyester by weight. The styrene contained 110 parts per million by weight of hydroquinone as inhibitor. In order to increase the trixotropic properties of the compositions, 1.22 percent by weight of dehydrated silica hydrogel were added to the composition.

*Example II.*—An unsaturated polyester was prepared by the esterification of the following ingredients:

|  | Mols |
| --- | --- |
| Diethylene glycol | 1.0 |
| Propylene glycol | 3.6 |
| Phthalic anhydride | 2.6 |
| Maleic anhydride | 2.0 |

The resulting polyester was dissolved in styrene to achieve a solution of 40 parts by weight of styrene and 60 parts by weight of polyester. The styrene contained 140 parts per million by weight of hydroquinone as inhibitor. The composition was blended with 9 percent by weight of inert white pigment, 16 percent by weight of china clay, and 2 percent by weight of dehydrated silica hydrogel.

*Example III.*—The final formulation of Example II was further blended with 18 percent by weight of ammonium chloride in pulverulent form, i.e., the ammonium chloride passed through a 40 mesh U.S. standard screen and 70 percent by weight also passed through a 100-mesh U.S. standard screen.

*Example IV.*—An unsaturated polyester was prepared by esterification of the following ingredients:

|  | Mols |
| --- | --- |
| Diethylene glycol | 1.0 |
| Propylene glycol | 3.6 |
| Phthalic anhydride | 2.15 |
| Tetrabromophthalic anhydride | 0.45 |
| Maleic anhydride | 2.0 |

The resulting unsaturated polyester was dissolved in styrene to achieve a solution containing 40 parts by weight of styrene and 60 parts by weight of the polyester. The styrene contained 140 parts by million by weight of hydroquinone as inhibitor. Five percent by weight of tris-dichloroethyl-phosphate were added to the styrene solution.

It will be observed that Examples I and II are conventional unsaturated polyester resin compositions containing no flame retardant additives. Example III is a preferred flame retardant polyester resin composition containing pulverulent ammonium halide. Example IV is a flame retardant polyester resin composition which employs a highly halogenated dicarboxylic anhydride in the preparation of the polyester to achieve flame retardancy.

BURNING TESTS

A series of modified boat tests was carried out with the compositions of Examples I, II, III and IV. A standard test in the boat building industry involves pouring five gallons of gasoline into a 14-feet long boat hull fabricated from polyester resin compositions. The gasoline is set afire to determine the effect of fire on the boat hull. Since fabrication of a 14-feet long boat hull requires a substantial amount of resin composition, a modified test has been developed which employs only 2.2 pounds of resin a 14-inch long boat hull. The corresponding quantity of gasoline is 208 milliliters.

The gasoline is poured into test boat hulls and ignited. When the flame dies out, the remaining boat hull is observed.

Boat hulls formed from laminates of the type illustrated in FIGURE 1 (some without the glaze coat) were prepared with the resin compositions of Examples I, II, III and IV. The fibrous laminate core in each boat hull included two layers of glass fiber mat.

The gel coat thickness was approximately 1/16-inch. The fibrous laminate core was approximately 1/8-inch thick. Where a glaze coat was provided, its thickness was between 1/32-inch and 1/16-inch. The composition of each boat hull and the results of the modified fire test are set forth in the following Table I.

*Table I.—Results of Burning Tests*

| Test | Gel Coat | Laminate Core | Glaze Coat | Results |
| --- | --- | --- | --- | --- |
| 1 | II | I | none | Burned completely. |
| 2 | II | IV | none | Did not burn. |
| 3 | III | IV | none | Did not burn.ᵃ |
| 4 | III | I | none | Burned completely. |
| 5 | III | I | III | Did not burn. |
| 6 | III | IV | III | Did not burn. |

ᵃ NOTE.—There was a loss of adhesion between the laminate and the gel coat.

From the inspection of Table I, it appears that structures made entirely from conventional polyester resin compositions (test 1) are not flame retardant. Similarly structures coated with flame retardant resin composition on only one exposed surface are not flame retardant (test 4). Structures having a flame retardant laminate core will not burn (tests 2, 3, 6). Structures, according to this invention, having a conventional fibrous laminate core and a flame retardant coating over both exposed surfaces will not burn (test 5).

According to the provisions of the patent statutes, I have explained the principle, preferred embodiment and mode of operation of my invention and have illustrated and described what I now consider to represent its best embodiment. However, I desire to have it understood that within the scope of the appended claims, the invention may be practiced otherwise than as specifically illustrated and described.

We claim:

1. A flame retardant fibrous polyester laminate structure having a fibrous laminate core comprising a fibrous filler and an unsaturated polyester resin composition which is not flame retardant, said unsaturated polyester resin composition being the thermoset polymerization product of a solution including (a) reactive monomer having terminal ethylenic linkage and (b) an unsaturated polyester formed by resinification of dihydric alcohol and coreactive acidic compound selected from the class consisting of dicarboxylic acids and anhydrides, at least one said coreactive acidic compound having alpha-beta ethylenic unsaturation, a gel coat adhered to one surface of said fibrous laminate core, said gel coat being a flame retardant polyester composition, and a glaze coat adhered to the opposed surface of said fibrous laminate core, said glaze coat being a flame retardant polyester composition, the said gel coat and the said glaze coat including from 5 to 50 percent by weight of pulverulent ammonium halide selected from the class consisting of ammonium chloride and ammonium bromide.

2. The method of molding a flame retardant fibrous polyester laminate structure which comprises applying to a mold surface a gel coat of hardenable unsaturated polyester resin composition including from 5 to 50 percent by weight of pulverulent ammonium halide selected from the class consisting of ammonium chloride and ammonium bromide, hardening said gel coat, applying to the hardened gel coat a fibrous laminate core comprising a fibrous filler and a hardenable unsaturated polyester resin composition which is not flame retardant, hardening said fibrous laminate core, applying to the hardened fibrous laminate core a glaze coat of hardenable unsaturated polyester resin composition including from 5 to 50 percent by weight of said ammonium halide, hardening said glaze coat and recovering the resulting laminate structure from the said mold.

References Cited in the file of this patent

UNITED STATES PATENTS

| | | |
|---|---|---|
| 2,602,037 | Nelb | July 1, 1952 |
| 2,781,076 | Kehe | Feb. 12, 1957 |
| 2,786,007 | Chew | Mar. 19, 1957 |

FOREIGN PATENTS

| | | |
|---|---|---|
| 755,551 | Great Britain | Aug. 22, 1956 |
| 217,555 | Australia | Sept. 30, 1958 |

OTHER REFERENCES

"Boat Builder Blankets Market With 10 Models," Plastics Industry, February 1950, pages 26, 27 and 32.